United States Patent
Lin et al.

(12)

(10) Patent No.: US 6,337,526 B1
(45) Date of Patent: *Jan. 8, 2002

(54) STATOR STRUCTURE

(75) Inventors: Kuo-cheng Lin; Wen-shi Huang; Te-tsai Chuang, all of Taoyan (TW)

(73) Assignee: Delta Electronics, Inc. (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/539,904

(22) Filed: Mar. 31, 2000

(30) Foreign Application Priority Data

Nov. 1, 1999 (TW) .......................................... 088218652

(51) Int. Cl.[7] .............................. H02K 7/09; H02K 1/12
(52) U.S. Cl. ....................................... 310/90.5; 310/254
(58) Field of Search ................................ 310/90.5, 194, 310/193, 254, 152, 156

(56) References Cited

U.S. PATENT DOCUMENTS 5,859,487 A * 1/1999 Chen ............................ 310/254
6,097,120 A * 8/2000 Horng ........................ 310/90.5

* cited by examiner

Primary Examiner—Nestor Ramirez
Assistant Examiner—Guillermo Perez

(57) ABSTRACT

A stator structure comprising a plurality of upper spaced apart tabs substantially circularly arranged and formed on a first plane; and a plurality of lower spaced apart tabs substantially circularly arranged, complementary to the plurality of upper spaced apart tabs, and formed on a second plane parallel to the first flat surface, characterized in that the outer portion of each of the plurality of lower spaced apart tabs or upper spaced apart tabs extends to a position below or above the magnetic belt of the rotor so as to employ the magnetic force generated by the magnetic belt and the lower spaced apart tabs or upper spaced apart tabs to maintain balancing of the rotor while rotating.

6 Claims, 4 Drawing Sheets

STATOR STRUCTURE

BACKGROUND OF THE INVENTION

1. Field of the Invention

The present invention relates to a stator structure, and in particular, to an improved stator structure employing magnetism to achieve balancing of a motor stator so as to reduce vibration thereof.

2. Description of the Related Art

Common motors mainly comprise two parts, a stator and a rotor. The rotation of the motor is caused by the alternating variations of magnetic fields acting the stator to drive the rotor to rotate. A rotating shaft coupled to the stator via a bearing is used to support the rotor to rotate about the center line of the rotating shaft.

However, there are clearances in the bearing no matter what the type of the bearings is. These clearances can cause vibrations when the rotor rotates at a high speed. Due to the vibrations, the working efficiency of the motor is lowered, and the longevity of the motor is shortened.

FIG. 1 is a schematic view showing a conventional motor stator structure 100 comprising a magnetically conductive cylinder 101, an upper pole layer 102, a lower pole layer 103, an insulating layer 810 and a coil 820. The upper pole layer 102 is located on a first plane and is substantially in the shape of a ring, the internal side of the ring is mounted on the external side of the top end of the cylinder 101, and the external side of the ring is formed with a plurality of upper spaced apart tabs. The lower pole layer 103 is located on a second plane which is parallel to the first plane and is substantially in the shape of a ring, the internal side of the ring is mounted on the external side of the bottom end of the cylinder 101, and the external side of the ring is formed with a plurality of lower spaced apart tabs. Viewed from over the motor stator structure 100, the upper spaced apart tabs 102 and the lower spaced apart tabs 103 are complementary. The insulating layer 810 is mounted between the upper pole layer 102 and the lower pole layer 103 and is mounted on the magnetically conductive cylinder 101. The coil 820 is winding on the insulating layer 810.

FIG. 2 is a schematic view showing engagement of the rotor with the above mentioned conventional motor stator structure. In FIGS. 1 and 2, like numerals refer to like components. The rotor 700 comprises a body 701, a rotating shaft 702 connected to the center of the body 701; and a magnetic belt 703 circularly arranged at the internal circumference of the body 701. A bearing 830 is provided between the internal surface of the magnetically conductive cylinder 101 and the rotating shaft 702 such that the rotor 700 rotates about the center line of the stator 100. The position of the magnetic belt 703 is corresponding to that of the coil 820. Thus, the change of direction of the magnetic fields produced by the coil 820 interacts with the magnetic belt 703 and causes the entire rotor 700 to rotate.

The drawback of the above conventional stator structure lies in that the magnetic conduction portion of the stator is constituted by three components, that is, the magnetically conductive cylinder, the upper pole layer and the lower pole layer, and the connection area of the magnetically conductive cylinder and the upper, lower pole layer affects the magnetically conductive effect. Further, in the process of connecting, the magnetically conductive cylinder or the upper, lower pole layer may be easily broken due to inappropriate mounting force.

FIG. 3 is a schematic view showing another conventional stator structure 200, wherein the insulating layer and the coil are similar to those as shown in FIG. 1 and are denoted with like numerals. The stator structure 200 comprises a ring 201, a plurality of upper spaced apart tabs 202, a plurality of lower spaced apart tabs 203, a plurality of waist posts 204, an insulating layer 810, and a coil 820. The plurality of upper spaced apart tabs 202 are connected at the external side of the ring 201, which defines an upper plane. The lower spaced apart tabs 203 are spaced apart from the ring 201, are complementary to the plurality of upper spaced apart tabs 202 when viewed from over the stator structure 200, and are provided on a second plane which is parallel to the first plane. The waist posts 204 are located between the first plane and the second plane. Each of the waist posts 204 has one end connected with the connection area of the corresponding one of the plurality of the upper spaced apart tabs 202 and the ring 201 and has the other end connected at the inner end of the lower spaced apart tabs 203 so as to form a magnetically conductive path. The insulating layer 810 is positioned between the upper spaced apart tabs 202 and the lower spaced apart tabs 203, and on the waist posts 204. The coil 820 winds on the insulating layer 810.

FIG. 4 is a schematic view showing the engagement of the rotor with the conventional stator structure, wherein the rotor is similar to that as shown FIG. 2. In FIGS. 2 to 4, like numerals refer to like components.

The rotor 700 comprises a body 701; a rotating shaft 702 connected to the center of the body 701, and a magnetic belt 703 mounted on the internal circumference of the body 701. A bearing 830 is provided in between the rotating shaft 702 and the inner surfaces of the waist posts 204 such that the rotor 700 rotates about the center line of the stator 200. The position of the magnetic belt 703 is corresponding to that of the coil 820. Thus, the change of direction of the magnetic fields produced by the coil 820 and the induction of the magnetic belt 703 cause the entire rotor 700 to rotate.

The advantage of the conventional art is that the magnetically conductive path is integrally formed as a unit which can enhance the effect of the magnetic conduction. However, the conventional art have not solved the defect of vibration caused by the clearances as a result of the connection between the rotor and the stator by means of a bearing.

SUMMARY OF THE INVENTION

Accordingly, it is an object of the invention to provide a stator structure which can reduce vibration caused by the rotor which rotates at high speed so that the working efficiency of the motor is improved and the longevity of the motor is extended.

One aspect of the present invention is to provide a stator structure comprising a plurality of upper spaced apart tabs substantially circularly arranged and formed on a first plane; and a plurality of lower spaced apart tabs substantially circularly arranged, complementary to the upper spaced apart tab when viewed from over the stator structure, and formed on a second plane parallel to the first plane, characterized in that the outer portion of each of the plurality of lower spaced apart tabs or upper spaced apart tabs extends to a position below or above the magnetic belt of the rotor so as to employ the magnetic force generated by the magnetic belt and lower spaced apart tabs or upper spaced apart tabs to maintain balancing of the rotor while rotating.

Another object of the present invention is to provide a stator structure, wherein apart from using a bearing to connect the stator and the rotor, the magnetic force around the rotor and the stator is additionally employed to maintain the rotating balancing of the rotor. Thus, the vibration due to the clearances of the bearings, when the motor rotates, can be greatly reduced. At the same time, the stator structure has not been changed, and therefore there is no need any more to provide any additional addition component or manufacturing process for maintaining the balancing of the rotor.

DETAILED DESCRIPTION OF THE PREFERRED EMBODIMENT

An improved stator structure of the preferred embodiment of the present invention will be described in detail with reference to the accompanying drawings, wherein like numerals refer to like components.

Figure 5:
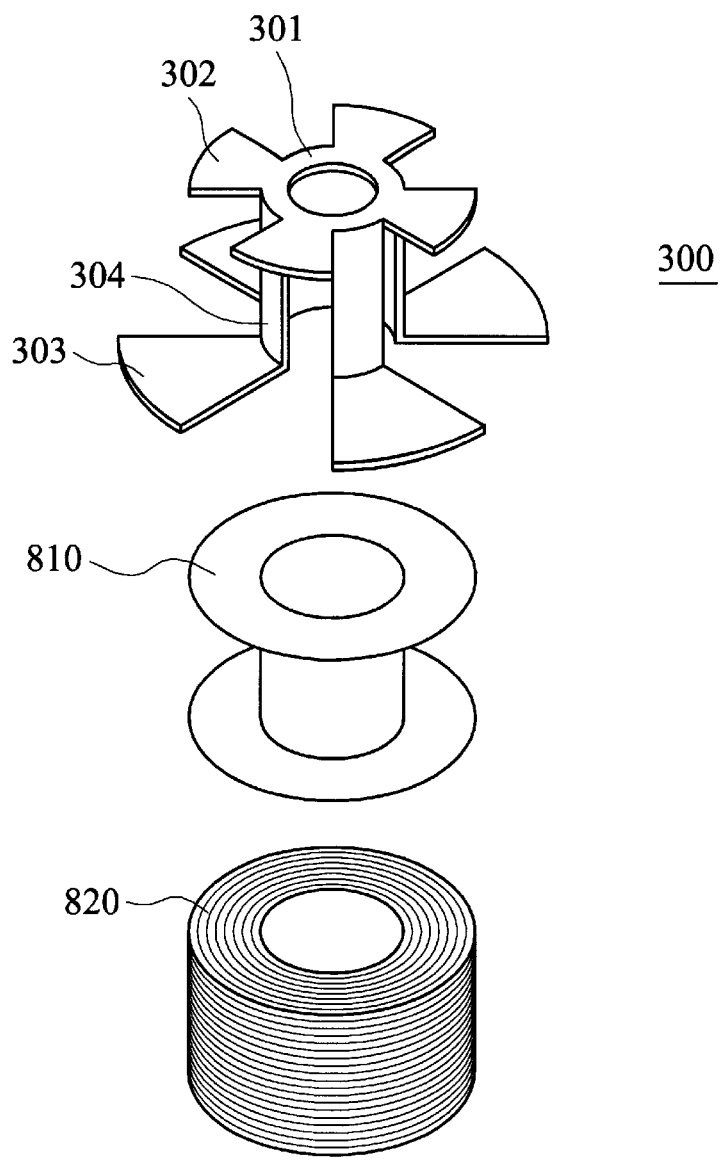
FIG. 5 is a schematic view showing the stator structure in accordance with a preferred embodiment of the invention.

Referring to FIG. 5, a stator structure 300 in accordance with a preferred embodiment of the invention comprises a ring 301; a plurality of upper spaced apart tabs 302 connected to the outer side of the ring 301 and formed on a first plane; a plurality of lower spaced apart tabs 303 spaced apart from the ring 301, complementary to the upper spaced apart tabs 302 when viewed over the stator structure 300, and formed on a second plane parallel to the first plane; a plurality of waist posts 304 located in between the first plane and the second plane, each having one end connected to the connection area between an upper spaced apart tabs 302 and the ring 301 and the other end connected to the inner side of a corresponding lower spaced apart tab 303 to form a magnetically conductive path; an insulating layer 810 formed between the plurality of upper spaced apart tabs 302 and the plurality of lower spaced apart tabs 303, and on the plurality of waist posts 304; and a coil 820 winding on the insulating layer 810.

Figure 3:
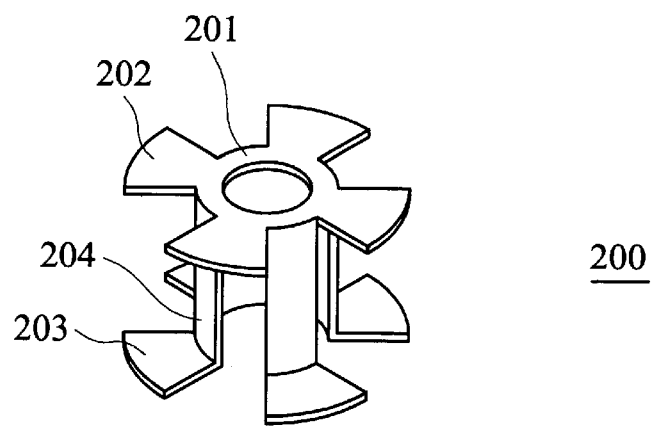
FIG. 3 is a schematic view showing another conventional motor stator structure.
Figure 3:
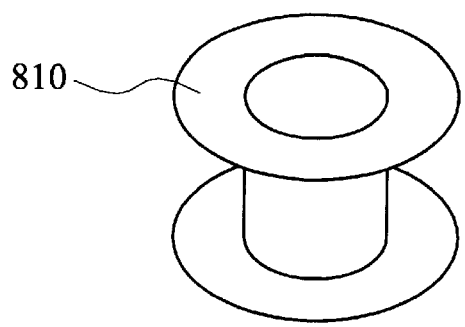
Figure 3:
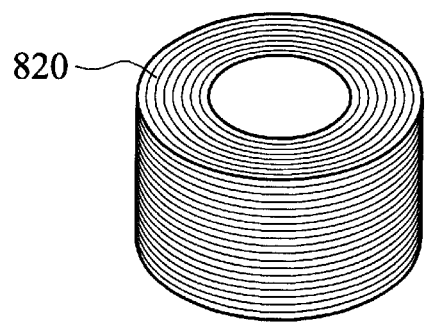
Figure 4:
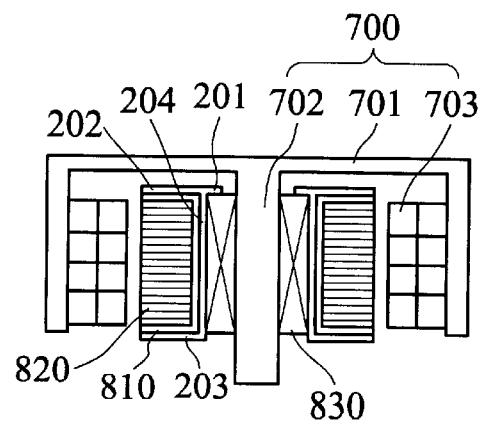
FIG. 4 is a schematic view showing the engagement between a rotor and the stator as shown in FIG. 3.

The stator structure in accordance with the preferred embodiment of the invention and the conventional stator structure 200 as shown in FIG. 3 are similar. The difference lies in that each of the lower spaced apart tab 303 is further extended outwardly.

Figure 6:
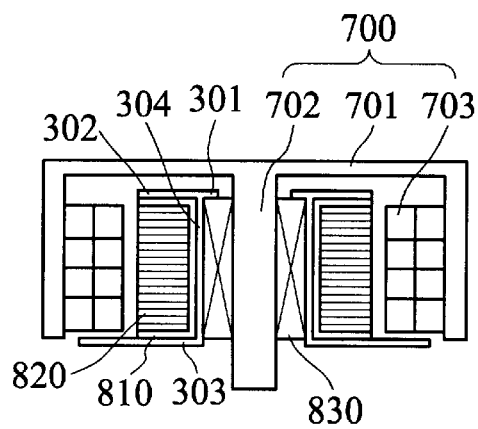
FIG. 6 is a schematic view showing the engagement between a rotor and the stator structure as shown in FIG. 5.

Referring to FIG. 6, the outer side of each of the lower spaced apart tabs 303 is extended outwardly to the position below the magnetic belt 703 of the motor stator 700. Thus, the outer portion of each of the lower spaced apart tabs 303 and the magnetic belt 703 generate an axial magnetic force.

As the magnetic belt 703 is mounted on the inner circumference of the rotor 700, the axial magnetic force is distributed symmetrically with respect to the rotating shaft. By employing such axial magnetic force acting on the entire magnetic belt 703, the rotating shaft of the rotor 700, while rotating, will not be tilted as a result of the clearances of the bearings 830, and the vibration resulted from the tilting of the rotor 200 while rotating can be avoided.

In addition, the magnetically conductive paths formed by the upper spaced apart tabs 302, the ring 301, the waist posts 304, and the lower spaced apart tabs 303 are integrally formed into a unit, and therefore no any additional component or process is required in order to achieve the effect of reducing the vibration of the rotor 700.

Figure 1:
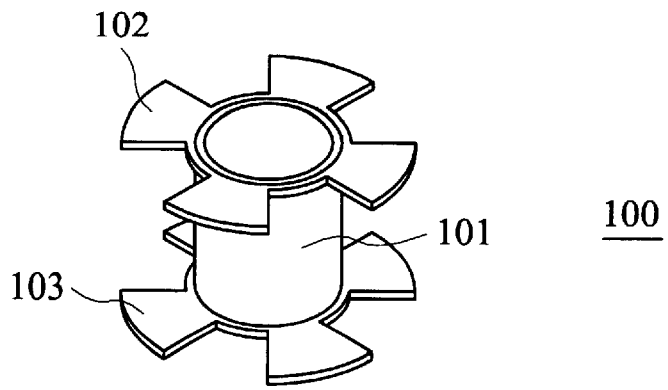
FIG. 1 is a schematic view showing a conventional motor stator structure.
Figure 1:
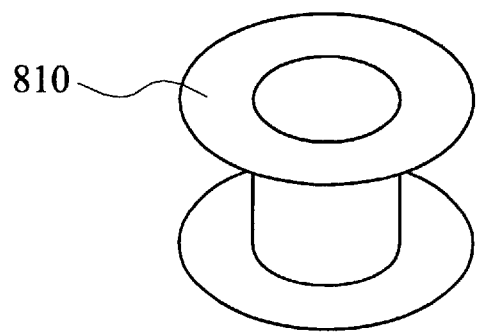
Figure 1:
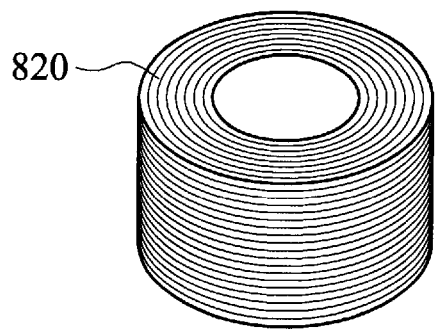
Figure 2:
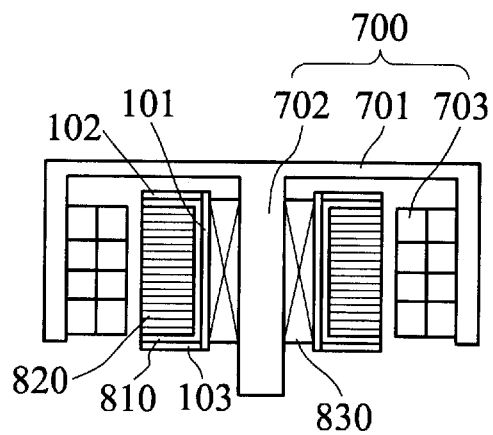
FIG. 2 is a schematic view showing the engagement between a rotor and the conventional stator structure as shown in FIG. 1.
Figure 7:
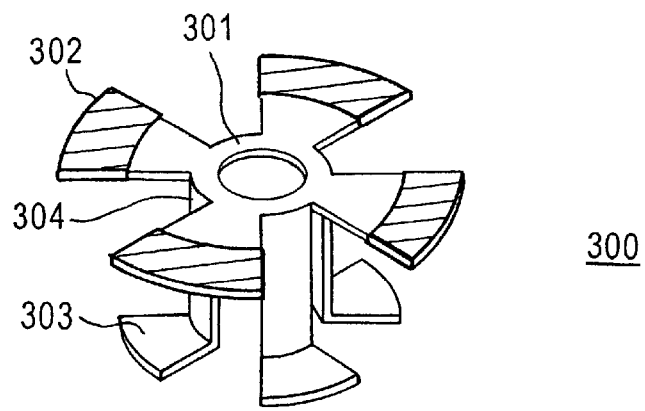
FIG. 7 is a schematic view showing the stator structure in accordance with a preferred embodiment of the invention.
Figure 7:
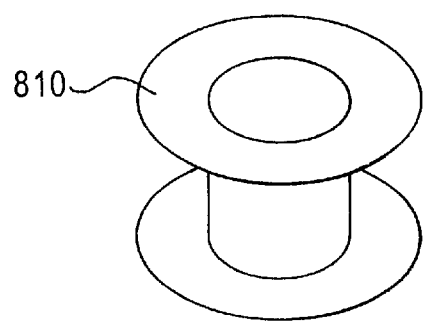
Figure 7:
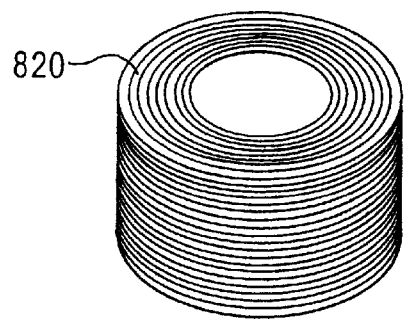
Figure 8:
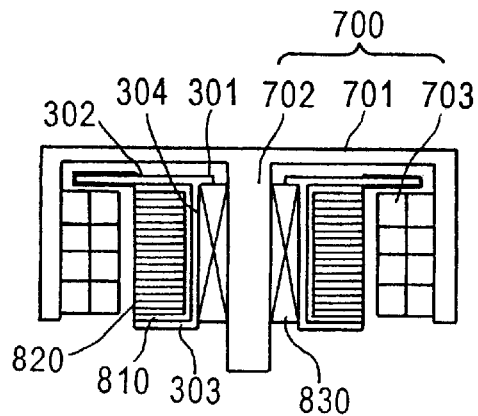
FIG. 8 is a schematic view showing the engagement between a rotor and the stator structure as shown in FIG. 7.

While the invention has been described by way of example and in terms of a preferred embodiment, it is to be understood that the invention is not limited to the disclosed embodiment. To the contrary, it is intended to cover various modifications. For example, in the conventional stator as shown FIG. 1, the lower spaced apart tabs can be extended outwardly to achieve the object of the invention without any additional stator component or other processes. Furthermore, in the preferred embodiment shown in FIGS. 7, and 8, it is also preferred to outwardly extend the upper spaced apart tabs rather than the lower spaced apart tabs to achieve the same function without departing from the spirit of the invention.

While the invention has been described with respect to a preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

What is claimed is:

1. A stator structure for driving a rotor having a magnetic belt, said stator structure comprising:

a body integrally formed from a magnetically conductive material, and having a plurality of upper and lower spaced tabs;

said upper spaced tabs substantially circularly arranged in a first plane;

said lower spaced tabs substantially circularly arranged, complementary to the upper spaced tabs when viewed from over the stator structure, in a second plane parallel to the first plane;

wherein an outer portion of each of said lower spaced tabs extends, while remaining within the second plane, to a position below the magnetic belt of the rotor so as to employ magnetic attraction between the magnetic belt and said lower spaced tabs to maintain balancing of the rotor while rotating.

2. A stator structure as set forth in claim 1, wherein the magnetic material is in the form of a silicon steel sheet.

3. A stator structure for driving a rotor having a magnetic belt, said stator structure comprising:

a body integrally formed from a magnetically conductive material, and having a plurality of upper and lower spaced tabs;

said upper spaced tabs substantially circularly arranged in a first plane;

said lower spaced tabs substantially circularly arranged, complementary to the upper spaced tabs when viewed from over the stator structure, in a second plane parallel to the first plane;

wherein an outer portion of each of said upper spaced tabs extends, while remaining within the first plane, to a position above the magnetic belt of the rotor so as to employ magnetic attraction between the magnetic belt and the upper spaced tabs to maintain balancing of the rotor while rotating.

4. A stator structure as set forth in claim 3, wherein the magnetic material is in the form of a silicon steel sheet.

5. A stator for driving a rotor having a magnetic belt, comprising:

a ring;

a plurality of upper spaced tabs radially extending from a periphery of the ring and substantially circularly arranged in a first plane;

a plurality of lower spaced tabs substantially circularly arranged, angularly complementary to the upper spaced tabs, in a second plane parallel to the first plane;

a plurality of waist posts located between said first plane and said second plane, each of the waist posts having one end connected to a connection area between one of said upper spaced tabs and said ring, and the other end connected to a corresponding lower spaced tab to form a magnetically conductive path;

an insulating layer formed between said upper and lower spaced tabs, and sheathed on said waist posts; and a coil winding on said insulating layer;

wherein an outer portion of each of said lower spaced tabs extends, while remaining within the second plane, to a position below the magnetic belt of the rotor so as to employ magnetic attraction between the magnetic belt and said lower spaced tabs to maintain balancing of the rotor while rotating.

6. A stator for driving a rotor having a magnetic belt, comprising:

a ring;

a plurality of upper spaced tabs radially extending from a periphery of the ring and substantially circularly arranged in a first plane;

a plurality of lower spaced tabs substantially circularly arranged, angularly complementary to the upper spaced tabs, in a second plane parallel to the first plane;

a plurality of waist posts located between said first plane and said second plane, each of the waist posts having one end connected to a connection area between one of said upper spaced tabs and said ring, and the other end connected to a corresponding lower spaced tab to form a magnetically conductive path;

an insulating layer formed between said upper and lower spaced tabs, and sheathed on said waist posts; and a coil winding on said insulating layer;

wherein an outer portion of each of said upper spaced tabs extends, while remaining within the first plane, to a position above the magnetic belt of the rotor so as to employ magnetic attraction between the magnetic belt and the upper spaced tabs to maintain balancing of the rotor while rotating.

* * * * *